United States Patent
von Benda et al.

[11] Patent Number: 5,427,158
[45] Date of Patent: * Jun. 27, 1995

[54] VIBRATION FILLING OF FOAM-STRUCTURE AND FIBER-STRUCTURE ELECTRODE FILLING OF FOAM-STRUCTURE AND FIBER-STRUCTURE ELECTRODE PLAQUES WITH AQUEOUS CADMIUM OXIDE PASTE OF HIGH FLOWABILITY

[75] Inventors: Klaus von Benda, Nürtingen; Gábor Benczùr-Ürmössy, Stuttgart; Gerhard Berger, Deizisau, all of Germany

[73] Assignee: Deutsche Automobilgesellschaft mbH, Germany

[ * ] Notice: The portion of the term of this patent subsequent to Dec. 4, 2007 has been disclaimed.

[21] Appl. No.: 94,261

[22] Filed: Jul. 21, 1993

Related U.S. Application Data

[60] Division of Ser. No. 41,333, Apr. 1, 1993, Pat. No. 5,387,366, which is a continuation of Ser. No. 873,691, Apr. 22, 1992, abandoned, which is a continuation of Ser. No. 357,273, May 26, 1989, Pat. No. 4,940,553.

[30] Foreign Application Priority Data

May 26, 1988 [DE] Germany .................. 38 17 827.3

[51] Int. Cl.$^6$ .......................................... H01M 4/80
[52] U.S. Cl. ...................................... 141/1.1; 141/11; 141/32; 141/69; 29/2; 29/623.1; 252/182.1; 429/222
[58] Field of Search ............... 252/182.1; 141/1.1, 141/11, 32, 69; 29/2, 623.1; 429/222

[56] References Cited

U.S. PATENT DOCUMENTS

| | | | |
|---|---|---|---|
| 3,890,159 | 6/1975 | Thornton | 252/182.1 |
| 4,169,075 | 9/1979 | Kuhling et al. | 252/313.1 |
| 4,608,325 | 8/1986 | Ismail | 252/182.1 |
| 4,880,435 | 11/1989 | Itou et al. | 429/222 |
| 4,938,780 | 7/1990 | Kaiya et al. | 429/222 |
| 4,940,553 | 7/1990 | von Benda et al. | 252/182.1 |
| 4,974,644 | 12/1990 | von Benda et al. | 429/225 |
| 5,069,258 | 12/1991 | Imhof | 141/1.1 |
| 5,094,774 | 3/1992 | Imhof et al. | 252/182.1 |

*Primary Examiner*—Edward A. Miller
*Attorney, Agent, or Firm*—Evenson, McKeown, Edwards & Lenahan

[57] ABSTRACT

An aqueous cadmium oxide paste of high flowability for the vibration filling of foam-structure and fiber-structure electrode plaques is characterized by a cadmium oxide content of about 25 to 35% by volume, a pH of about 10 to 12.5, a content of about 0.5 to 2.5% by weight, based on cadmium oxide, of one or more dispersants from the group comprising the water-soluble salts of polyphosphoric acids, di- and polyphosphonic acids and their derivatives, gluconic acid or of antimonyl tartrate. The paste has a plastic viscosity of about 0.1 to 1 Pa.s and also a yield value of between about 10 and 120 Pa. This cadmium oxide paste makes it possible to fill foam-structure and fiber-structure electrode plaques completely in one operation.

10 Claims, No Drawings

VIBRATION FILLING OF FOAM-STRUCTURE AND FIBER-STRUCTURE ELECTRODE FILLING OF FOAM-STRUCTURE AND FIBER-STRUCTURE ELECTRODE PLAQUES WITH AQUEOUS CADMIUM OXIDE PASTE OF HIGH FLOWABILITY

CROSS-REFERENCE TO RELATED APPLICATIONS

This is a divisional application of application Ser. No. 08/041,333, filed Apr. 1, 1993, now U.S. Pat. No. 5,387,366 which is a continuation of application Ser. No. 07/873,691, filed Apr. 22, 1992, and now abandoned, which is a continuation of application Ser. No. 07/357,273, filed May 26, 1989, now U.S. Pat. No. 4,940,0553, claiming priority of German application No. P 38 17 867.3, filed May 26, 1988.

BACKGROUND AND SUMMARY OF THE INVENTION

The present invention relates to an aqueous cadmium oxide paste of high flowability for the vibration filling of foam-structure and fiber-structure electrode plaques.

Industrial cadmium electrodes for Ni/Cd storage cells are manufactured in diverse embodiments. The pocket plate contains, in perforated nickel-plated iron-sheet segments, so-called briquettes which are composed of mixtures of finely divided metallic cadmium, iron oxide and graphite. The finely divided cadmium is often produced by electrolytic deposition together with nickel from acidic solutions of cadmium and nickel salt. The electrolytic deposition can also be carried out directly on a carrier foil; the layer is normally subsequently compacted. Electrodes with plastic binding composed of CdO or finely divided Cd on metal gauzes are also known.

Sinter plaque electrodes, which are preferably used for high currents, vented and sealed cells, contain the active Cd material in the file pores of the sintered plaque which are about 10 micrometers in size. These fine pores are impregnated by repeated soaking with a concentrated cadmium nitrate solution and precipitation of cadmium hydroxide in the pores by means of alkali hydroxide. The repeated soaking and precipitation is necessitated by the limited solubility of the cadmium salt. The process can be shortened by the electrochemical precipitation method (Kandler process) and results in the precipitation of cadmium hydroxide and cadmium. However, it is difficult to perform the Kandler process continuously because of the complicated chemical mechanism; it is therefore used only for producing high-grade electrodes.

Foam-structure and fiber-structure plaques have been used for about 15 years for electrode substrates and for supporting the active material. They are composed purely of metal or they contain in addition the structure-providing plastic or carbon basic body.

These plaques make possible a simple mechanical impregnation with a fluidized paste of active material. In contrast to the apertures of a gauze plate or grid plate, the pores of the plaque are small enough to hold the material introduced. However, compared with sintered plaques produced by powder metallurgy, the pores are larger, with the result that a suitably adjusted paste can penetrate almost completely and fill the cavities.

A suitable starting material for the paste is cadmium oxide, cadmium hydroxide or cadmium powder. At 4.8 g/cm$^3$, the density of cadmium hydroxide is comparatively low. The achievable concentration of material in the electrode is consequently also low. Cadmium hydroxide pastes are therefore not very suitable. It is not possible to formulate a stable paste composed of cadmium powder alone since the metal particles show a tendency to settle. The density of cadmium oxide is 8.15 g/cm$^3$ This high density makes it possible to produce cadmium electrodes with adequate cadmium concentration. Cadmium electrodes are used predominantly in nickel/cadmium cells.

In these nickel/cadmium cells, the necessary loading with active material and consequently the capacity are fitted to suit the positive nickel electrode capacity. A modern gastight nickel/cadmium satellite cell employing sintered electrodes (22nd IECEC, Philadelphia, August 1987, Paper 879076, Table 1) contains, for example, 12.4 g/dm$^2$ cadmium material. With the specified plate thickness of 0.068 cm and 80% porosity, this corresponds to 2.28 g of cadmium per cm$^3$ of pore volume. Converted to cadmium oxide, this corresponds to 2.60 g of cadmium oxide/cm$^3$ It is not possible to achieve such filling densities in one operation with the cadmium oxide pastes hitherto known.

Cadmium oxide powder can be dispersed well in some selected organic liquids having a polar nature. For example, cyclohexanol, butyl glycollate or ethyl lactate are suitable. The dispersions employing these organic liquids can be produced, for example, in a blade mixer such as a Waxing Blendor.

In this process, the loose, bulky agglomerates of the cadmium oxide primary particles are destroyed. Only by doing this are liquid dispersions containing up to 33% by volume of cadmium oxide fraction (2.69 g of cadmium oxide/cm$^3$) obtained. These dispersions are, however, only of limited suitability for filling foam-structure and fiber-structure plaques. On the one hand, after a few hours, reactions are observed between cadmium oxide and fluid which alter the flowability (for example, in the case of butyl glycollate), and, on the other hand, demixing and settling occur (for example, in the case of cyclohexanol). The drying and the recovery of the fluid, and the disposal of the solvent vapors produced during drying present technical problems and are cost-consuming.

With water as fluid, a concentration of 21% by volume of cadmium oxide is achieved at best. In the course of few hours, such pastes thicken as a consequence of the reaction of cadmium oxide and water to form cadmium hydroxide. Japanese published specification (Japan Kokai Tokkyo Koho) 78-136,634 described an aqueous cadmium oxide paste containing 14% by volume of cadmium oxide in which the reaction of the cadmium oxide with the water is inhibited by adding sodium hydrogenphosphate, sodium pyrophosphate or sodium hexametaphosphate. This paste is as little suited to the achievement of high filling densities with a single filling as the cadmium oxide paste in 30% KOH as suspension fluid described in German Patent Specification 1, 596,023. As is known, cadmium oxide reacts in aqueous KOH in a few minutes to form cadmium hydroxide in an exothermic reaction.

Accordingly, an object of the present invention is to provide an aqueous cadmium oxide paste which has such a high flowability that the pores of the foam-structure or fiber-structure electrode plaques can be competely filled with the aqueous cadmium oxide paste.

Another object of the present invention is to provide an aqueous cadmium oxide paste having a high flowability so that the pores of the foam-structure or fiber structure electrodes have such a high cadmium oxide content that the complete filling of the porous body can be achieved in one operation.

Other objects, advantages and novel features of the present invention will become apparent from the following detailed description of the preferred embodiments of the present invention.

DETAILED DESCRIPTION OF PREFERRED EMBODIMENTS OF THE PRESENT INVENTION

The paste according to preferred embodiments of the present invention has a cadmium oxide content of about 25 to 35% by volume, a pH of about 10 to 12.5, a content of about 0.5 to 2.5% by weight, based on cadmium oxide, of one or more dispersants from the group comprising the water-soluble salts of polyphosphoric acids, di- and polyphosphonic acids and their derivatives, gluconic acid or alkali antimonyl tartrate. Furthermore, the paste has a plastic viscosity of about 0.1 to 1 Pa.s and a yield value of between about 10 and 120 Pa.

From a rheological point of view, the cadmium oxide paste according to certain preferred embodiments of the invention belongs to the class of plastic bodies. Usually an ideal plastic behavior is found (so-called Bingham bodies). The viscosity is not a material constant and it can be represented only in a shear stress/velocity gradient flow diagram. Below a certain shear stress, the paste is solid, the value corresponding to the yield value. In the case of ideal plastic behavior, there is linearity between wear stress and velocity gradient after the yield value has been exceeded. The so-called plastic viscosity is the quotient of the shear stress less the yield value and the velocity gradiant. The yield value and the plastic viscosity describe the system completely.

For an explanation of the rheological terms and methods of measurement, reference is made to the Contraves company publication entitled "Messung rheologischer Eigenschaften" ("Measurement of theological properties") (Bulletin T 990 d-7309), section 6.3 (Plastic flow behavior) and also to the publication by A. Fincke and W. Heinz "Zur Bestimmung der Fliessgrenze grobdisperser Systeme" ("On the determination of the yield value of coarsely dispersed systems"), Rheological Acta, 1 (1961), 530.

The measurements were carried out with the rotation viscometer Rotovisco RV 12 manufactured by Haake using the measuring devices NV and MV I. Shear rates (velocity gradients) of about at least 110/S should be achieved. For the purpose of the evaluation, use was made of the relaxation curve. The measurements were carried out at about 20° C. The paste is suitable for the vibration filling method if the yield value is between about 10 and 120 Pa and the plastic viscosity is about 0.1 to 1 Pa.s. The paste should preferably have a slight thixotrophy (time dependence of the viscosity). After the filling operation, the paste should remain liquid for a time in order to facilitate a removal of excess paste from the surface of the filled body. It should not, however, be so liquid so that it is able to escape again from the pores and form troublesome drainage drops. These conditions are achieved if yield value and viscosity are within the specified values.

In order to achieve the high concentration of about 25 to 35% by volume of cadmium oxide (about 1 to 2.85 g of cadmium oxide/$cm^3$) in the paste with simultaneous fulfilling of the theological requirements, highly effective dispersants are required. Suitable dispersants are those from the group comprising the water-soluble salts, in particular the alkali salts of polyphosphoric acids, di-and polyphosphonic acids and their derivatives, gluconic acid or alternatively alkali antimonyl tartrate. These dispersants are used in quantities of about 0.5 to 2.5% by weight, based on cadmium oxide. According to the observation of the applicant, they act both as dispersant and as inhibitor of the reaction between CdO and water. In the case of the polyphosphates, the effectiveness as a dispersant and as an inhibitor increases with the chain length. Polyphosphates containing about 2 to 20. in particular those containing about 6 to 20, phosphorus atoms are therefore preferred.

A particularly effective group of dispersants is also formed by the di- and polyphosphonic acids and their derivatives. Since the carbon atoms of the di- and polyphosphonic acids are broken down to form carbon dioxide by the charging and discharging processes at the electrode, those di- and polyphosphonic acids are preferred in which the ratio of C atoms to P atoms does not exceed about 2 in order to keep the formation of carbonate in the cell as low as possible. The water-soluble salts of 1-hydroxyethane-1, 1-diphosphonic acid or of aminostrismethylenephosphonic acid are very particularly suitable and are also cheaply obtainable commercially.

It is known that, in small quantities, nickel develops a beneficial expansion effect in the cadmium electrode. These quantities of nickel can be introduced particularly beneficially into the electrode if an alkali-metal/-nickel complex of 1-hydroxyethane-1, 1-diphosphonic acid (HEDP) is used as dispersant. This form of introduction into the active material achieves a particularly fine uniform distribution. Within the general formula $Ni_xM_yH_z$ (HEDP) where $2x+y+z=4$ (M=alkali-metal), the following bandwidths are permissible: x=about 0.5 to 1.2; y=about 1 to 2.5; z=about 0 to 1. A suitable dispersant is produced by disolving nickel hydroxide in the free acid $H_4$ (HEDP) and adding alkali hydroxide Further suitable dispersants are the salts, in particular the alkali salts, of gluconic acid and also alkali antimonyl tartrate. Of course, mixtures of dispersants may also be used.

The pH of all the pastes is shifted towards higher values compared with the pH of the dispersive solutions by an alkalization effect. In order to be able to comply with the required viscosity date, the pH must be between about 10 and 12.5.

The paste may also contain pulverulent nickel hydroxide as expansion agent in quantities of about 0.25 to 3 mol-%, based on cadmium. Some of the active material may also be composed of cadmium powder. In that case, the cadmium oxide paste contains about one part by weight of metallic cadmium powder to about 1 to 15 parts by weight of cadmium oxide. This variant is of interest particularly for gastight nickel/cadmium cells since they can be immediately sealed and formed after assembly. The cadmium introduced then acts as a discharge reserve (precharge).

The paste is produced in the dispersion apparatuses normal in industry. Ball mills and blade mixers are preferred. The paste has to be sheared until the claimed rheological characteristic data are achieved. In high speed blade mixers, such as a Waring Blendor, about 1 to 5 minutes of action time are envisaged. In ball mills, the production of the paste takes about 1 to 8 hours. In the case of pulverulent cadmium oxide starting material, the bulky aggregates are destroyed in this process. If the starting point is pelletized cadmium oxide, the times can be shortened since the compacting work has already been performed during the pelletizing. Pastes which comply with the specified parameters are suitable for filling electrode plaques with foam structure and fiber structure in one operation. The pastes are readily processable and retain their rheological and other properties over a fairly long period of time.

EXAMPLE 1

About 400 g of cadmium oxide (about 32.8% by volume) in pelletized form, about 3 g of nickel hydroxide (about 0.5% by volume) and about 100 ml (about 66.7% by volume) of an aqueous solution which contained about 20 g/l of a commercially available alkali polyphosphate mixture (Calgon N, manufactured by Benckiser-Knapsack) were sheared for about 2 minutes in the mixing container of a Waring Blendor. This produced a cadmium oxide paste which could be discharged by pouring it out of the container. The following theological data were determined from the flow curve of the freshly produced paste by extrapolation and regression calculation (measuring device NV, maximum velocity gradient about 122/s): yield value=about 12 pa, plastic viscosity=about 0.19 Pa.s. The cadmium oxide content of the paste is about 2.67 g/cm$^3$.

EXAMPLE 2

An approximately 0.1 molar solution of the composition $Ni_{1.2}K_{1.6}$ (HEDP) was used as dispersive solution. To produce 1 liter of this solution, about 34.33 g of about 60% 1-hydroxyethane-1,1-diphosphonic acid (Turpinal SL, manufactured by Henkel) were weighed into a beaker and approx. 800 ml of deionized water were added. Approximately 11.13 g of nickel hydroxide were dissolved in it while stirring and heating at about 70° C. After being cooled down, about 20 g of about 47% KOH were added to this solution while stirring, which increased the pH to about 8. The solution was made up to 1 liter.

Approximately 700 g of cadmium oxide powder (about 23.4% by volume), about 234.5 g of cadmium powder (about 7.4% by volume, manufactured by Zinchem) and about 254 ml (about-69.2% by volume) of the above dispersive solution were rolled in a 1 liter porcelain ball mill using about 400 g porcelain balls with a diameter of about 16 mm for approximately two hours at about 70 rev/min. The paste produced contains a total of about 2.31 g/cm$^3$ cadmium. From the flow curve of the paste, the following theological data were obtained (measuring device NV, maximum velocity gradient about 173/s): yield value=about 22 Pa, plastic viscosity=about 173/s): yield value=about 22 Pa, plastic viscosity=about 0.28 Pa.s. The pH of the paste was about 11.9.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A process for making electrode plaques of either foam structure or of fiber structure including the steps of:
   (a) preparing a high flowability, aqueous CdO paste comprising a CdO content in the range of about 25 to 35% by volume, a pH in the range of about 10 to 12.5, a content in the range of about 0.5 to 2.5% by weight, based on CdO, of at least one dispersant selected from the group consisting of water-soluble salts of polyphosphoric acids, di- and polyphosphonic acids, gluconic acid and alkali antimonyl tartrate, and said paste having a plastic viscosity in the range of about 0.1 to 1 Pa.s and a yield value in the range of about between 10 and 120 Pa and
   (b) vibration filling the plaques with the paste.

2. The process according to claim 1, wherein the at least one dispersant is selected from the group consisting of di- and polyphosphonic acids having a ratio of C atoms to P atoms which does not exceed about 2.

3. The process according to claim 1, wherein the at least one dispersant is selected from the group consisting of water-soluble salts of at least one of 1-hydroxyethane-1, 1-diphosphonic acid and aminotrismethylenephosphonic acid.

4. The process according to claim 1, wherein the at least one dispersant is a polyphospate containing about 2 to 10 P atoms.

5. The process according to claim 1, wherein the at least one dispersant is a polyphosphate containing about 6 to 20 P atoms.

6. The process according to claim 1, wherein the at least one dispersant is in alkali salt form.

7. The process according to claim 3, wherein the dispersant is a nickel salt of 1-hydroxyethane-1,1-diphosphonic acid (HEDP) of the formula $Ni_xM_yH_z$ (HEDP), where M is an alkali metal, $2x+y+z=4$ and x assumes values between about 0.5 and 1.2, y assumes values between about 1 and 2.5 and z assumes values between about 0 and 1.

8. The process according to claim 7, wherein the paste contains solid $Ni(OH)_2$ in addition to the soluble nickel salt of HEDP acid.

9. The process according to claim 3, wherein the dispersant is a nickel salt of 1-hydroxyethane-1,1-diphosphonic acid (HEDP) having a formula of $Ni_{1.2}M_{1.6}$ (HEDP.

10. A process for making electrode plaques of foam structure and fiber structure, comprising the steps of
    (a) preparing a high flowability, aqueous CdO paste comprising a CdO content in the range of about 25 to 35% by volume, a pH in the range of about 10 to 12.5, a content in the range of about 0.5 to 2.5% by weight, based on CdO, of at least one of a dispersant selected from the group comprising water-soluble salts of polyphosphoric acids, di- and polyphosphonic acids and their derivatives, gluconic acid and alkali antimonyl tartrate, and a plastic viscosity in the range of about 0.1 to 1 Pa.s and a yield value in the range of about between 10 and 120 Pa and
    (b) vibration filling the plaques with the paste.

* * * * *